April 24, 1934.   O. FUCHS   1,956,440
PROCESS FOR PREPARING ACETALDEHYDE
Filed Oct. 23, 1928
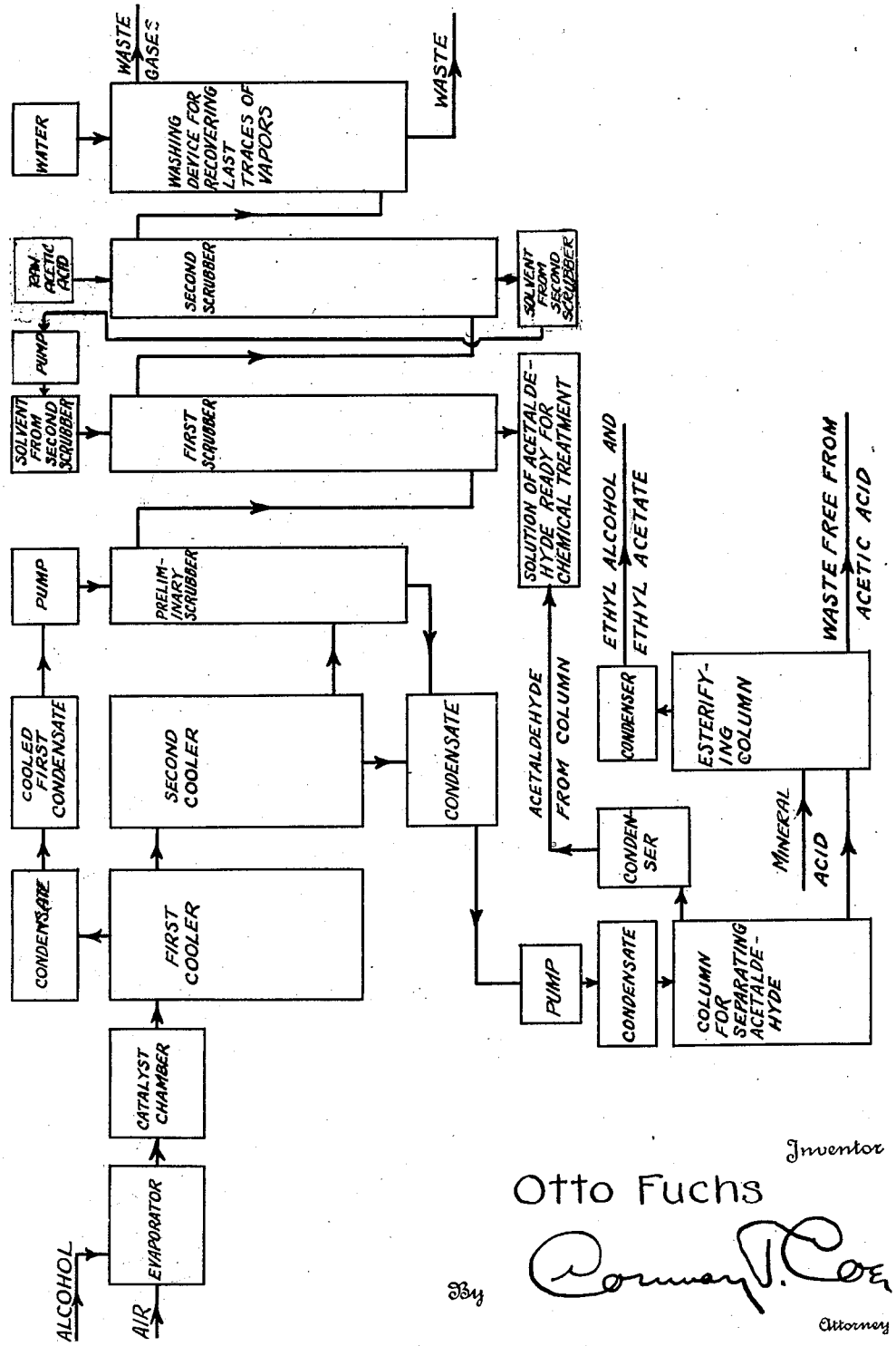
Inventor
Otto Fuchs
By [signature]
Attorney Patented Apr. 24, 1934

1,956,440

UNITED STATES PATENT OFFICE

1,956,440

PROCESS FOR PREPARING ACETALDEHYDE

Otto Fuchs, Constance, Germany, assignor, by mesne assignments, to the firm of Deutsche Gold- und Silber - Scheideanstalt vormals Roessler, Frankfort-on-the-Main, Germany, a corporation of Germany Application October 23, 1928, Serial No. 314,542
In Germany November 4, 1927

9 Claims. (Cl. 260—138)

The present invention relates to the utilization of ethyl alcohol by conversion into acetaldehyde and other products, more particularly oxidation and condensation products.

It is known to pass ethyl alcohol in the form of vapor over catalysts and thereby cause decomposition of the alcohol into acetaldehyde and hydrogen. This reaction however is not suitable for the production of acetaldehyde and further products therefrom as owing to the equilibrium existing between the three substances ethyl alcohol, acetaldehyde, and hydrogen, the dehydrogenation of the ethyl alcohol is not complete. Attempts have therefore been made to oxidize the hydrogen formed in the above reaction to water by using a mixture of air and alcohol vapor and to obtain the acetaldehyde by washing the reaction gases with water. The disadvantage of this process however is that the aqueous solution of aldehyde produced cannot usually be used directly but must first be converted into anhydrous acetaldehyde by suitable treatment, more particularly distillation, involving use of steam and loss of material. Further when proceeding directly without absorption by water, the presence of the water vapor formed by the oxidation of the hydrogen on the contact substance is found to be disadvantageous. It has been found for example that on oxidation of the mixture of acetaldehyde and water first obtained acetic acid of only an approximately 85% concentration is obtained. It is also noticeable inter alia that, according to the working conditions employed, certain amounts of unchanged ethyl alcohol pass over along with the acetaldehyde which for example in the further treatment to produce acetic acid will lead to the undesired formation of ethyl acetate. In addition, certain amounts of alcohol e. g. 5% and over, are converted into acetic acid on the contact substance and further quantities of acetic acid are formed by the action of the atmospheric oxygen on the aldehyde first formed and thus very dilute (about 1%) practically valueless acetic acid is obtained.

The process according to the present invention consists in the catalytic conversion of a mixture of ethyl alcohol and gases containing oxygen into acetaldehyde, removal as far as possible of the water from the reaction gases emerging from the contact chamber by excessive cooling, and treatment with anhydrous or practically anhydrous solvents in order to obtain the acetaldehyde. The aqueous condensate then contains both the unchanged alcohol carried over and the acetic acid formed, so that in the treatment of the gases a solution of pure aldehyde in the organic solvent used is obtained. The cooled aqueous condensate may advantageously be used for further washing of the reaction gases, thus removing the disadvantages of fractional condensation and more particularly effecting practically complete removal of unchanged ethyl alcohol. The relatively small proportion of acetaldehyde contained in the aqueous condensate can be obtained as anhydrous aldehyde e. g. by distillation. The acetic acid is preferably utilized by treating the condensate of ethyl alcohol, water and acetic acid, before working up to concentrated alcohol, with a catalyst e. g. some mineral acid. The acetic acid is then obtained practically quantitatively as ethyl acetate, which separates from the alcohol as first runnings, whilst the latter can be used after recovery, for producing further quantities of acetaldehyde.

The solvents used are preferably substances which allow further treatment of the aldehyde in the presence thereof and also with the assistance thereof. If the aldehyde is to be converted into condensation products e. g. aldol, paraldehyde and the like, the end product i. e. aldol or paraldehyde is preferably employed as the solvent. When converting the aldehyde into acetic acid, the latter, preferably anhydrous or concentrated, is used as the solvent for the acetaldehyde. In order to produce acetals, the alcohol concerned is used advantageously as the solvent e. g. ethyl alcohol to produce e. g. diethylacetal solutions of acetaldehyde being obtained which, after addition of a small quantity of mineral acid, give quantitative yields of the desired acetal by distillation.

The advantage given by the invention is that owing to the surprisingly large yields of acetaldehyde, further treatment of the same to form condensation and oxidation products can be carried out to give large yields without the inconveniences and disadvantages mentioned. A further advantage is that alcohol containing water, even in large quantity, can be used as the starting substance for the manufacture of acetaldehyde, which again has the further advantage of allowing catalysts to be used which when treating high percentage alcohols could cause objectionable side reactions, such as for example decomposition into gaseous products, as a result of too violent reaction. Such catalysts are for example silver in a finely divided form on e. g. asbestos, pumice or the like, platinized silver and the like.

The flow sheet is illustrative of my process and shows a convenient manner of carrying out the method of this application. It is not to be considered in any way as restricting the scope of the invention.

*Examples*

1. A mixture of alcohol vapor and air in the proportion of about 1 cubic metre of air to 1 litre of 90% alcohol, is passed over a contact substance formed of silver wire gauze. The reaction continues after the initial heating without supply of further heat owing to the heat of reaction, 80–85% of the alcohol undergoes reaction. The reaction gases are cooled to about 15° C. in stages by two successive coolers. The reaction gases, after cooling, are led to a washing tower, located after the second cooler, where practically all of the alcohol vapor is washed out of the gases. A condensate consisting of about 270 gms. water, 120 gms. alcohol, 30 gms. acetic acid and about 80 gms. acetaldehyde (corresponding to 15% of the total yield of aldehyde) is obtained per litre of alcohol (90%) treated. This condensate is preferably treated in a small column, to which it is continually being led, from which the acetaldehyde escapes at the top in an anhydrous form and with practically no loss, and can be obtained by cooling. The aqueous liquid flowing out at the base is treated in a second column after addition of 3% sulphuric acid. About 150 gms. of concentrate containing 96 gms. alcohol and 42 gms. ethyl acetate is obtained from the quantities mentioned above. The aldehyde remaining in the reaction gases (450 gms. per litre of alcohol treated) is practically all removed by washing in a washing tower or two towers in succession through which aldol trickles, a cooler also being used if necessary.

The concentrated solution of acetaldehyde in aldol thus obtained can be treated straight away by known methods of condensation e. g. by means of alkalies, to form aldol. Thus the advantage is obtained in the first place that the condensation reaction proceeds quietly owing to the presence of the aldol which acts as a diluent, and in the second place the condensation goes on without trouble owing to the absence of acetic acid, which is otherwise always present in the acetaldehyde coming into contact with the air, but is absent in the present case as the aldehyde has been washed out of gases absolutely free from acid.

2. A mixture of air and the vapor obtained from 70% alcohol is passed over the contact substance mentioned in Example 1; the reaction proceeds automatically after the initial heating notwithstanding the water vapor content. 80% and more of the alcohol undergoes reaction. The gases passing over are subjected to cooling and condensation as in Example 1. A condensate of about 500 gms. water, 100 gms. alcohol, 25 gms. acetic acid and 130 gms. aldehyde (corresponding to 30% of the total yield of aldehyde) is obtained per litre of alcohol treated. 35 gms. of ethylacetate are obtained by the further treatment of the condensate as in Example 1. The aldehyde left in the reaction gases (310 gms. per litre of alcohol treated) is washed out quantitatively by about 98% acetic acid in two washing towers having internal cooling. The aldehyde obtained from the condensate is added to the solution which is then treated in the usual manner e. g. with gases containing oxygen, to form acetic acid. Despite the fact of using alcohol containing a considerable amount of water and that further quantities of water are formed in the conversion of the alcohol into aldehyde, highly concentrated acetic acid is produced by this method. As the unchanged alcohol is kept absent from the process, reduction of the yield of acetic acid by formation of ethyl acetate is avoided.

I claim:

1. In the process for preparing acetaldehyde by passing a mixture of ethyl alcohol and gases containing oxygen over a catalyst, the improvement which comprises condensing the effluent gases to remove water and then treating the remaining gases with a solvent to obtain acetaldehyde.

2. In the process for preparing acetaldehyde by passing a mixture of dilute ethyl alcohol and gas containing oxygen over a catalyst, the improvement which comprises condensing the effluent gases to remove water and then treating the remaining gases with a solvent to obtain acetaldehyde.

3. In the process for preparing acetaldehyde by passing a mixture of ethyl alcohol and a gas containing oxygen over a catalyst, the improvement which comprises condensing the effluent gases to remove water, and then treating the cooled effluent gases with a solvent to obtain acetaldehyde, said solvent being of such a nature as to facilitate subsequent treatment of the acetaldehyde.

4. In the process for preparing acetaldehyde by passing a mixture of ethyl alcohol and gas containing oxygen over a catalyst, the improvement which comprises condensing the effluent gases to remove water, and treating the cooled gases with a solvent to obtain acetaldehyde, said solvent being of such a nature as to combine with the acetaldehyde dissolved therein to form a different compound under suitable reaction conditions upon the addition of reagents.

5. In the process for preparing acetaldehyde by passing a mixture of ethyl alcohol and gases containing oxygen over a catalyst, the improvement which comprises condensing the effluent gases to remove water, and washing the cooled gases with acetic acid.

6. In the process for preparing acetaldehyde by passing a mixture of ethyl alcohol and gases containing oxygen over a catalyst, the improvement which comprises condensing the effluent gases to remove water, some alcohol, and any acetic acid formed, and then treating the cooled gases with a solvent to obtain acetaldehyde.

7. In the process for preparing acetaldehyde by passing a mixture of ethyl alcohol and gases containing oxygen over a catalyst, the improvement which comprises cooling the effluent gases to about 15° C. so as to remove water therefrom, and then treating the cooled gases with a solvent to obtain acetaldehyde.

8. In the process for preparing acetaldehyde by passing a mixture of ethyl alcohol and gases containing oxygen over a catalyst, the improvement which comprises cooling the effluent gases in a plurality of cooling zones to condense water therefrom and then treating the cooled gases with a solvent to obtain acetaldehyde, said gases being led from the last cooling zone at a temperature of about 15° C.

9. In the process for preparing acetaldehyde by passing a mixture of ethyl alcohol and gases containing oxygen over a catalyst, the improvement which comprises condensing the effluent gases to remove water, and dissolving the acetaldehyde contained in said gases in a liquid organic compound into which the acetaldehyde is to be converted.

OTTO FUCHS.